United States Patent [19]

Buchalet

[11] 4,244,616
[45] Jan. 13, 1981

[54] TOOL FOR EXCHANGING AND TRANSPORTING IRRADIATION CAPSULES OF A NUCLEAR REACTOR

[75] Inventor: Christian Buchalet, L'Etang la Ville, France

[73] Assignee: Framatome, Courbevoie, France

[21] Appl. No.: 10,159

[22] Filed: Feb. 7, 1979

[30] Foreign Application Priority Data

Feb. 17, 1978 [FR] France .................. 78 04531

[51] Int. Cl.$^2$ ............................................. B66C 1/54
[52] U.S. Cl. ........................... 294/86 A; 294/86.25; 294/86.15; 294/93
[58] Field of Search .............. 294/86 A, 86 R, 86.15, 294/86.25, 86.24, 86.13, 86.14, 88, 93, 95, 97; 176/37, 12, 31

[56] References Cited

U.S. PATENT DOCUMENTS 3,801,148  4/1974  Rosgen et al. .................. 294/86 A

FOREIGN PATENT DOCUMENTS 1360066  3/1964  France .................. 294/86 A

*Primary Examiner*—James B. Marbert
*Attorney, Agent, or Firm*—Haseltine and Lake

[57] ABSTRACT

A tool for exchanging and transporting irradiation capsules of a nuclear reactor using water, which capsules contain samples experiencing, during the operation of the reactor, comparable irradiation to that experienced by the reactor vessel, between several positions along the heat shield surrounding the core thereof, said tool comprises tongs comprising pivotable fingers pivotable between an inoperative position and an operative position for engaging a capsule, mounted in the region of the lower end of a vertical operating tube and controlled by first coaxial cam means mounted at the end of a vertical operating rod which is coaxial with the operating tube, said rod having a handle at its upper part and being movable vertically between a position in which said fingers are in the inoperative position and a position in which said fingers are in their operative position, means for exerting a downward thrust on a capsule by said operating tube comprising a double-acting jack comprising a piston having a rod which is formed by said operating tube, said piston being slidably mounted in a cylinder which is coaxial with said operating tube, means for supplying pressurized fluid to the chambers of said jack, and clamp means mounted for pivotal movement about horizontal axes on said cylinder of said jack between an inoperative position and an operative position in which bearing surfaces thereof are intended to co-operate with a fixed part of the reactor, and controlled by second cam means mounted on said operating rod.

3 Claims, 4 Drawing Figures

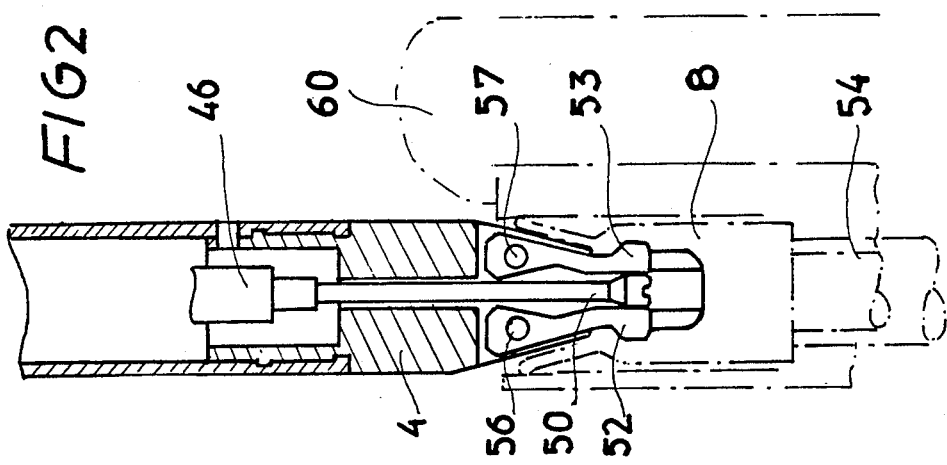
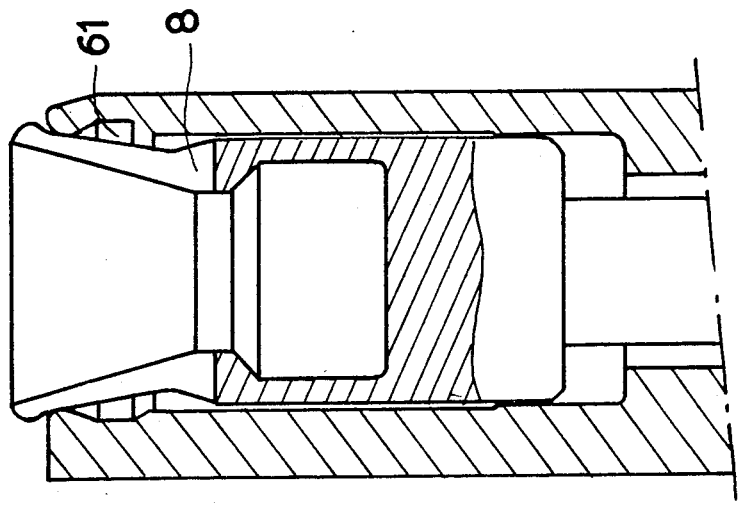
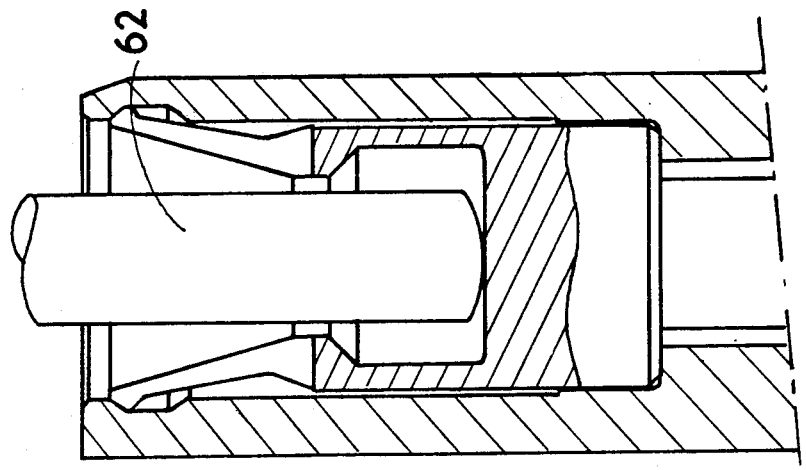

TOOL FOR EXCHANGING AND TRANSPORTING IRRADIATION CAPSULES OF A NUCLEAR REACTOR

The invention relates to a tool for exchanging and transporting irradiation capsules of a nuclear reactor using water.

Throughout the period of use of nuclear reactors, which period can be very long, it is necessary to monitor the behaviour of the material constituting the vessel and to check at arranged intervals of time that this material still possesses adequate mechanical characteristics, despite the doses of irradiation received during the long periods of use.

For this purpose, it is necessary to carry out mechanical tests on samples or test-pieces, which are made of steel of the same type as that constituting the reactor vessel and have experienced similar irradiation to that experienced by the vessel during the same period of time, when the reactor is recharged with fuel, that is to say approximately every year, and when the reactor undergoes general inspection, that is to say about every ten years.

Irradiation capsules are therefore provided in baskets welded to the heat shield surrounding the core of the reactor, these irradiation capsules consisting of a tube, the upper part of which possesses a cap for handling the capsules and fixing the tube in the baskets, and which contains test-pieces which are made of steel identical to that of the reactor vessel and are intended for mechanical tests such as tensile strength or impact tests.

During the operation of the reactor, these steel samples, located inside the capsules against the heat shield of the reactor, experience irradiation comparable to that experienced by the vessel.

when the reactor is recharged with fuel or inspected, some of the irradiation capsules are withdrawn in order to extract therefrom the samples or test-pieces which they contain, and in order to carry out the mechanical tests for which these samples and test-pieces were intended, this making it possible to monitor the change in the material of the reactor vessel.

In order to remove these capsules, a tool is used which comprises a vertical operating tube, at the lower part of which are located pivoting fingers which can be remote-controlled by means of a coaxial cam which is fast with the lower part of an operating rod mounted coaxially with the operating tube. The operating rod is fast at its upper part with a handle which makes it possible to place the cam either in the position for locking the fingers of the tongs or in an unlocking position, the fingers coming into position, when they are locked, in housings provided in the cap at the top of an irradiation capsule.

When the fingers are engaged on the cap at the top of the capsule, the operating handle can be locked in this locking position and an anchoring device, which is fast with the upper part of the operating tube, can be fixed to the crane of the reactor building in order to raise the capsule and transport it to a place provided in the swimming pool of the reactor for introduction into a lead cask which is to be used for transporting the capsule to the testing laboratory.

When the lower part of the tube is at the level of the cap of a capsule, the upper part of the operating tube, which comprises the anchoring device and the operating handle, is at the level of the platform of the machine for charging the reactor.

According to the azimuthal position of the capsules against the shield of the reactor, the irradiation experienced, during the operation of the reactor, by the samples present in the capsules can vary essentially because of the geometry of the core. The samples or test-pieces present in certain capsules experience more irradiation than that experienced by the reactor vessel; on the other hand, other samples or test-pieces present in other capsules experience less irradiation than the irradiation experienced by the vessel.

Now, it is necessary that the test-pieces or samples used for monitoring the material of the reactor vessel experience at least as much irradiation as that experienced by the reactor vessel. It is therefore necessary to exchange the positions of the capsules when the core of the reactor is recharged or when the reactor is inspected.

The exchanges therefore imply that the capsules can be reinserted in their housing or basket along the heat shield of the reactor either inside the actual reactor vessel, during the recharging operations, or inside the swimming pool of the reactor, when the internal parts of the reactor have been placed in this swimming pool for inspection during a general check on the reactor.

The tool used hitherto, which is quite satisfactory for extracting the capsules, is not capable of reinserting the capsules, this operation requiring a thrust on the cap constituting the upper part of the capsule in order to force the cap, in the shape of a tulip, into a housing which is provided for engaging this cap.

The use of a special tool for carrying out this insertion has been envisaged, but this requires an additional investment and the reservation of a special place for storing this tool inside the swimming pool of the reactor between successive uses thereof.

According to one aspect of the invention there is provided a tool for exchanging and transporting irradiation capsules of a nuclear reactor using water, which capsules contain samples experiencing, during the operation of the reactor, comparable irradiation to that experienced by the reactor vessel, between the vessel and the swimming pool and between several positions along the heart shield surrounding the core thereof, said tool comprising tongs comprising pivotable fingers pivotable between an inoperative position and an operative position for engaging a capsule, mounted in the region of the lower end of a vertical operating tube and controlled by first coaxial cam means mounted at the end of a vertical operating rod which is coaxial with the operating tube, said rod having a handle at its upper part and being movable vertically between a position in which said fingers are in the inoperative position and a position in which said fingers are in their operative position, means for exerting a downward thrust on a capsule by said operating tube comprising a double-acting jack comprising a piston having a rod which is formed by said operating tube, said piston being slidably mounted in a cylinder which is coaxial with said operating tube, means for supplying pressurised fluid to the chambers of said jack, and clamp means mounted for pivotal movement about horizontal axes on said cylinder of said jack between an inoperative position and an operative position in which bearing surfaces thereof are intended to co-operate with a fixed part of the reactor, and controlled by second cam means mounted on said operating rod.

According to another aspect of the invention there is provided a method of using the above described tool to introduce an irradiation capsule into a housing therefor in the heat shield surrounding the core of said reactor, said housing resiliently engaging said capsule, said method comprising positioning said fingers of said tool relative to a capsule for engagement thereof, moving said operating rod to operate said first cam to move said fingers to said operative position to engage said capsule, moving said tool and capsule engaged thereby to position said capsule partially in said housing, moving said operating rod to operate said second cam to move said clamp means into said operative position in clamping engagement with a fixed part of said reactor so that said cylinder of said jack is axially fixed, supplying fluid under pressure to said jack so as to exert a downward thrust on said piston and said operating tube and so as to exert a downward thrust on said capsule to force said capsule into position in said housing, and moving said operating rod so as to move said fingers and said clamp means to said inoperative positions thereof.

The invention will be more fully understood from the following description of an embodiment thereof, given by way of example only, with reference to the accompanying drawings.

In the drawings:

FIG. 2 is an analogous view, but on a larger scale, of the lower part of the tool showing the pivoting fingers in operative position engaging the capsule, and FIG. 3 and FIG. 4 are sectional views of the cap at the top of the irradiation capsule when the capsule is being reinserted in its housing.

Figure 1:
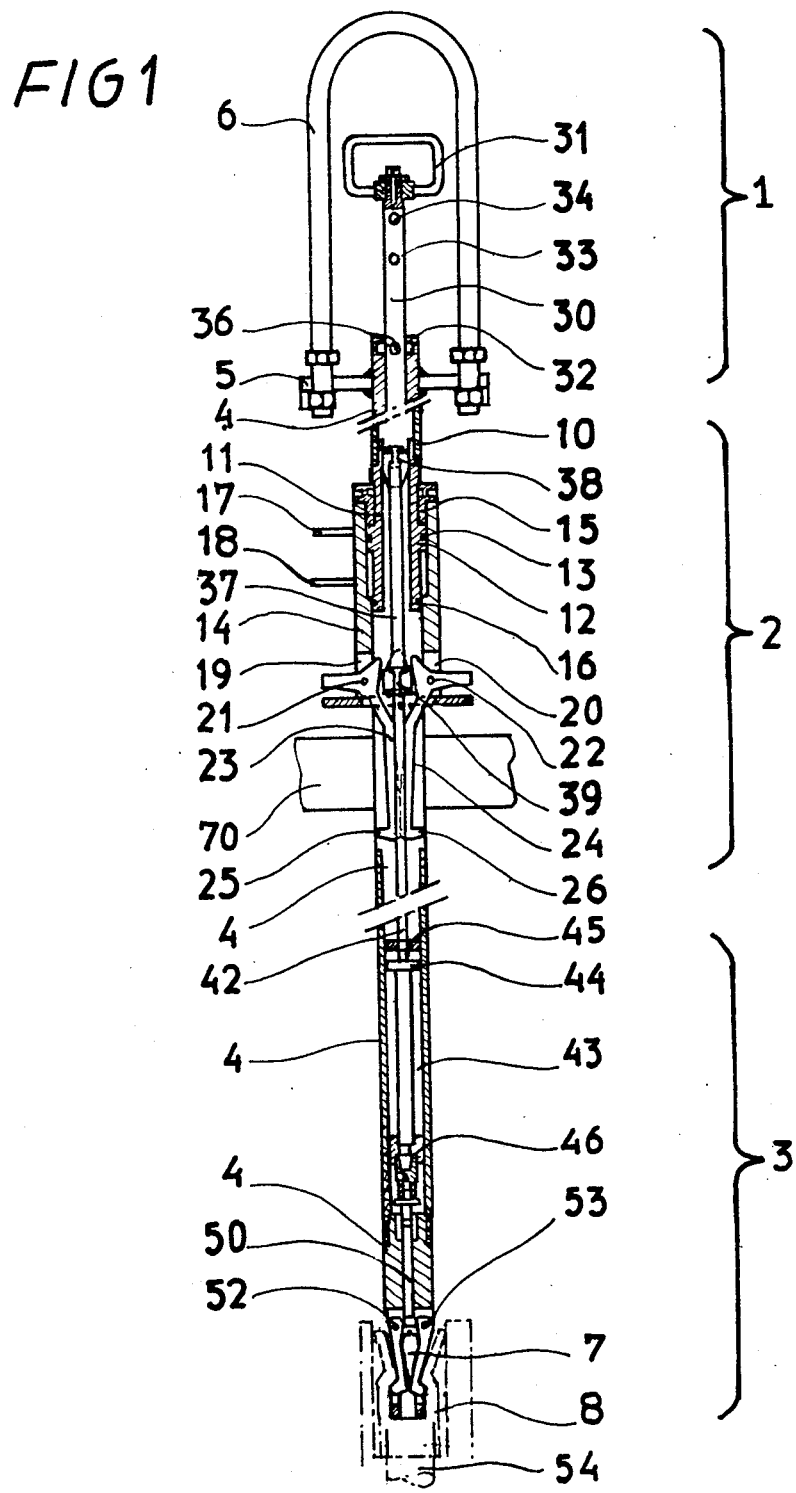
FIG. 1 is a vertical section through the longitudinal axis of an embodiment of a tool according to the invention in position above an irradiation capsule of a nuclear reactor.

FIG. 1 shows a tool for exchanging and transporting the irradiation capsules in a reactor using water (under pressure) both inside the reactor vessel and in the swimming pool thereof. The tool comprises three parts, namely an upper part 1, a central part 2 and a lower part 3.

The upper part 1 comprises a mechanism for the manual control of the tool, and an anchoring device for engagement by means for transporting the tool and a capsule.

The central part 2 comprises a jack for reinserting the capsule in a housing therefor and clamps for anchoring the jack on internal equipment of the reactor.

Finally, the lower part 3 comprises tongs comprising fingers 52, 53 for engaging an irradiation capsule.

The tool comprises a very long operating tube 4, the upper part of which is connected to an anchoring plate 5 on which is fixed a U-bolt 6 for engagement by means for raising and transporting the tool with an irradiation capsule when it is to be transferred between the reactor vessel and the swimming pool.

The lower part of the operating tube comprises a part 7 in the shape of a truncated cone, so that the end of this lower part of the tube is of small diameter for the introduction of the tube into the upper part of the irradiation capsule, which upper part consists of a recessed cap 8 in the shape of a tulip which is upwardly flared.

It is in this lower part 7, which is provided with vertical slots, that the fingers 52, 53 for engaging the irradiation capsule are located, the vertical slots making it possible to move the fingers out from a retracted inoperative to an extended gripping position in the recess in the cap of the capsules. This part of the tool will be described in greater detail with reference to FIG. 2.

The upper part of the tube 4 is connected, at the level of a joining piece 10, to a tubular piston 11 of the jack, the piston 11 comprising a central part 12, the diameter of which is greater than that of the extreme parts and which possesses a peripheral groove 13 in which a ring seal can be provided for mounting the piston 11 in a cylinder 14 of the jack, which is mounted coaxially relative to the operating tube 4.

The cylinder 14 comprises an upper part which is closed by a leaktight sealing device 15 and inside which the piston 11 of the jack is slidably mounted in a leaktight manner, the piston 11 being connected to upper and lower parts of the operating tube 4 which constitutes the rod of the jack.

The lower part of the piston 11 comprises a gasket 16 which makes it possible to close the upper part of the cylinder of the jack, in which the central part 12 of the piston 11 moves, and to which pressurised fluid is fed either through a pipe 17 or through a pipe 18, depending on the direction in which the double-acting jack is actuated, the fluid exerting a thrust on one or other face of the part 12 of the piston.

The lower part of the cylinder 14 of the jack is provided with openings 19 and 20 which communicate with the central opening in the lower part of the cylinder and inside which are mounted horizontal axles 21 and 22 which pivot in the cylinder of the jack and are made integral with two clamps 23 and 24 comprising, in their lower parts, two bearing plates 25 and 26 which have approximately horizontal bearing surfaces. The clamps 23, 24 are pivotable between an inoperative retracted position, as shown in FIG. 1, and an operative extended position.

Inside the operating tube 4 is mounted an operating rod 30 which is coaxial with the operating tube and connected at its upper part with a handle 31 for moving the operating rod in the vertical direction.

The upper part of the operating rod 30 is provided with three cylindrical drilled holes 32, 33 and 34 which are intended to co-operate with a pin 36 for locking the rod to prevent movement of the operating rod relative to the operating tube, in three different positions corresponding to different positions of various members of the tool, as will be explained below.

The central part of the operating rod comprises a two-part cam 37 comprising two actuating parts 38 and 39 which are intended to co-operate with the clamps 23 and 24 in order to move them between their operative and inoperative positions.

The lower part of the operating rod consists of two telescopic parts 42 and 43. The part of smaller diameter, part 42, carries a pin 44 which moves inside two longitudinal slots provided in the part 43 of the operating rod, between the upper end 45 and the lower end 46 of the part 43. The part 42 of the operating rod moves, between these two extreme positions, inside the part 43 of the operating rod.

On either side of these extreme positions of the pin 44, the part 42 of the operating rod, which is connected to the upper part of this rod, causes the part 43 of the operating rod to move either upwardly or downwardly in order to actuate a cam 50 made integral with the lower part 46 of the part 43, which is itself guided in the operating tube 4.

The cam 50 actuates the pivoting fingers 52 and 53 which are located at the end of the operating tube.

FIG. 2 shows, on a larger acale, the end of the operating tube 4 in position in the recess in the cap 8 of an irradiation capsule comprising a tube 54 which contains samples of material indentical to the material of the nuclear reactor vessel and is made integral with this cap.

In FIG. 2, the pivoting fingers 52 and 53 are shown in their extended operative position engaged in the recess in the cap 8, the cam 50 being in the low position between these pivoting fingers which are mounted so as to pivot on the operating tube by means of horizontal axles 56 and 57.

In view of the shape of the recess of the cap 8, it can be seen that the locking of the pivoting fingers by the cam 50 in this position makes it possible to lift the irradiation capsule out of its housing against the heat shield 60 of the reactor when the operting tube is raised by means of the handling crane of the reactor building.

In contrast, in the inoperative position of the fingers shown in FIG. 1, the pivoting fingers are kept by the cam 50 in a disengaged retracted position in which the operating tube and fingers can enter freely into the recess in the cap 8 of the irradiation capsule.

FIG. 3 shows that the cap 8 of the irradiation capsule has an external shape which is such that the cap can be engaged resiliently inside a housing 61 which is provided in the upper part of the basket used to house the irradiation capsule against the shield 60 of the core of the nuclear reactor.

By exerting a thrust with a thrust device such as 62 shown in FIG. 4, it is possible to force the cap 8 into the housing 61 constituting the upper part of the basket for the irradiation capsules, in such a way that the flexible conical part constituting the upper part of the cap 8 becomes firmly engaged in the housing 61 by virtue of elastic deformation.

It will be seen that, using the above described device, it is the operating tube 4 itself which produces this thrust on the cap of the irradiation capsule.

The operation of the tool, during an operation for exchanging an irradiation capsule between two locations against the heat shield of the reactor, will now be described with reference to FIGS. 1, 2, 3 and 4.

In order to centre and position the tool on the upper part of an irradiation capsule, holes are provided in the flange 70 of the core jacket directly above each of the locations of the housings of the irradiation capsules, these holes being closed by detachable caps which are of the same type as the caps 8 of the irradiation capsules and are pushed by force into the holes provided in the flange of the core jacket directly above the irradiation capsules.

The first operation to be carried out is therefore the removal of the caps on the flange of the core jacket directly above the irradiation capsules which are to be exchanged. When the lower part 7 of the tool has been brought in the recess in the closure cap on the flange of the core jacket, the cam 50 is actuated by means of the handle 31, or by means of another device for actuating the operating rod in the case where the handle 31 is then at too high a level relative to the platform for recharging the reactor, in order to place the fingers, 52, 53 in the operative position inside the cap, the cap being then removed by raising the operating tube.

The cap is then stored in a position which is reserved for it in the swimming pool of the reactor.

The cap closing that hole in the core jacket of the reactor which is directly above the second location selected for exchange is then removed in the same manner.

When the two corresponding holes on the flange of the core jacket are clear, the tool is brought into one of the holes and allowed to descend until it comes into position in the cap 8 at the top on one of the irradiation capsules which is to be exchanged.

The pivoting fingers 52 and 53 are then in the inoperative position shown in FIG. 1, the cam 50 being kept in the raised position by means of the operating rod 30, and the rod 30 being maintained in this position by the pin 36 which is located in the hole 32.

In this position, the cam 37 forming the central part of the operating rod is in a position which is such that the actuating device 39 of this cam keeps the clamps 23 and 24 in their inoperative retracted position shown in FIG. 1, the heels of the bearing pieces 25 and 26 coming into contact, and this makes it possible to pass the clamps 23 and 24 through the hole provided in the flange of the core jacket 70 directly above the irradiation capsule.

This is possible because the clamps 23 and 24 are mounted off-centre relative to the operating rod, a the axis of which coincides with the axis of the operating tube.

The handle 31 is then lowered as far as its low position in which the hole 34 has taken up the position previously occupied by the hole 32, it then being possible to lock the operating rod in this position, relative to the operating tube, by means of the pin 36.

During this descending movement of the operating rod inside the operating tube, the pin 44, carried by the operating rod, comes into contact, through the sliding of the part 42 of the operating rod in the part 43, with the lower part 46 fast with the cam 50, with the result that the cam 50 is moved donwardly until it moves the pivoting fingers to their operative position, as shown in FIG. 2. The position of the upper part 38 of the cam 37 is then such that it has become positioned against the upper parts of the clamps 23 and 24, in place of the lower part 39, in order to keep these clamps in the position shown in FIG. 1, in which position these clamps can pass through the hole provided in the flange of the core jacket. The part 39 of the cam 37 is then completely clear of the clamps 23 and 24.

With the operating rod locked in this position by means of the pin 36, the U-bolt 6, forming the upper part of the tool, is anchored to the handling crane of the reactor building and the irradiation capsule is lifted out of its housing by exerting a pulling force, this force being such that the cap is thereby released from its resilient engagement in its housing, and brought to a storage position in the swimming pool of the reactor. The tool is then freed from its engagement with its capsule.

An indentical operation is then carried out at the second chosen location in order to carry out the exchange. Instead of bringing the second irradiation capsule into the swimming pool of the reactor as above, it is brought to the location which has been vacated by the first irradiation capsule, until the cap rests on the upper part of the housing, as shown in FIG. 3.

The tool is then in the locking position, that is to say that the operating rod is in its low position, the hole 34 being engaged by the pin 36. The operating rod is then freed and brought into an intermediate position in which the hole 33 takes up the position previously occupied by the hole 34.

During this slight raising of the operating rod, the latter has no action on the cam 50, because the pin 44 was in the low position in the slot provided in the part 43 of the operating rod, the movement of the low part of the operating rod being restricted to a relative movement of the telescopic part 42 in the part 43.

On the other hand, the central part of the operating rod is moved so that the cam 37 then acts on the clamps 23 and 24, the actuating part 39 of the cam separating the clamps 23 and 24 so that they press against the edges of the hole provided in the flange of the core enveleope 70, with the result that the position of these clamps in the axial direction, and hence the position of the cylinder 14 of the jack which is connected with these clamps, is kept fixed by the operating rod which is locked in its intermediate position.

The piston 11 is then in its raised position, as shown in FIG. 1. The jack is then fed through the upper pipe 17 so that the upper chamber is supplied with pressurised fluid which exerts a downward force on the piston 11 connected to the rod 4, the reaction on the cylinder 14 of the jack then being supported by the clamps 23 and 24 which are kept against the flange of the core envelope 70 by means of the part 39 of the cam 37 of the operating rod. This thrust on the operating tube 4, which rests by its lower part on the base of the recess provided in the cap 8 of the irradiation capsule, causes a downward thrust on the irradiation capsule which enters its housing, as shown in FIGS. 3 and 4, which is resiliently deformed so that the capsule is resiliently engaged in the housing 61.

In the case of irradiation capsule used by the Applicant Company, it is necessary to exert a force of about 1,200 daN on the cap at the top of this capsule in order to engage the capsule in its housing.

By means of the handle 31, the operating rod is then brought back to its raised position, as shown in FIG. 1, after having withdrawn the pin 36 and returned the piston of the jack to its initial position. When the cam 37 has returned to the position shown in FIG. 1, the clamps 23 and 24 are again in their inoperative retracted position and this makes it possible for them to pass through the hole in the flange of the core jacket and for the tool to be raised and then transported towards the swimming pool of the reactor in order to take up the first capsule and to transport it into the reactor vessel and to insert it in the housing previously occupied by the second irradiation capsule, by means of identical operations to those which have just been described.

It is therefore seen that the above described tool can be used to carry out all the operations which are necessary for exchanging two irradiation capsules, it being possible for the tool to apply the insertion pressure to the upper part of the capsule. It is thus possible to carry out all these operations with a single tool.

The above described tool can also be used to carry out all the conventional operations carried out by the previously known tools involved in extracting a capsule but not reinserting it either inside the reactor vessel or in the swimming pool.

Although the operation for the exchange of capsule has been described for the case in which this operation is carried out in the reactor vessel itself, this operation can be carried out in the swimming pool of the reactor, the internal parts of the reactor having been placed there for a general inspection of the reactor.

The invention is not intended to be restricted to the embodiment which has just been described; on the contrary, it includes all the variants and it is possible to evisage modifications in points of detail without thereby going outside the scope of the invention.

Thus, the shape of the clamps for anchoring the cylinder of the jack on the flange of the core jacket and of their mode of action may be varied, it is possible to envisage other shapes for the clamps, the anchoring of which can be carried out in a different manner.

Likewise, the construction of the operating rod carrying the various actuating cams can be different from the construction which has just been described.

Finally, the tool which has just been described can be applied not only to the exchange of irradiation capsules in a reactor using water under pressure, but also to the handling and the reinsertion of irradiation capsules in any type of reactor using water, in which capsules of this kind are used for monitoring the vessel.

What is claimed is:

1. A tool for exchanging and transporting irradiation capsules of a nuclear reactor using water, the capsules containing samples experiencing, during operation of the reactor, comparable irradiation to that experienced by the reactor vessel, between the vessel and the swimming pool and between positions along the heat shield surrounding the core of the reactor, said tool comprising:

a vertical operating tube;
a vertical operating rod coaxial with said operating tube and vertically movable relative thereto;
handle means mounted at the upper part of said operating rod;
tongs for engaging a capsule and comprising fingers;
means mounting said fingers on the lower end portion of said operating tube for pivotal movement between an inoperative position and an operative position for engaging a capsule;
first cam means operable to move said fingers between said operative and inoperative positions thereof;
means mounting said first cam means on the lower end portion of said operating rod for operation thereof by movement of said rod;
means for exerting a downward thrust on a capsule by said operating tube comprising a double-acting jack comprising a piston slidable in a cylinder and defining two chambers therewith, a piston rod connected to said piston, said cylinder being coaxial with said operating tube and said operating tube forming said piston rod, and means for supplying fluid under pressure to said chambers of said jack;
clamp means having bearing faces for co-operation with a fixed part of the reactor;
means mounting said clamp means on said cylinder of said jack for pivotal movement about horizontal axes between an inoperative position and an operative position for co-operation with the fixed part of the reactor;
second cam means operable to move said clamp means between said inoperative and operative positions thereof; and
means mounting said second cam means on said operating rod for operation thereof by movement of said rod.

2. A tool according to claim 1, wherein said operating rod comprises two parts mounted telescopically relative to one another, and means for limiting relative movement of said two parts in both directions of relative movement, one of said parts being connected to said first cam means and the other of said parts being connected to said upper part of said operating rod which comprises said handle means for manual control and to said second cam means, movement of said one part being controlled by said other part beyond said limits of relative movement thereof.

3. A method of using a tool according to claim 1 to introduce an irradiation capsule into a housing therefor in the heat shield surrounding the core of said reactor, said housing resiliently engaging said capsule, said method comprising;

positioning said fingers of said tool relative to a capsule for engagement thereof;

moving said operating rod to operate said first cam to move said fingers to said operative position to engage said capsule;

moving said tool and capsule engaged thereby to position said capsule partially in said housing;

moving said operating rod to operate said second cam to move said clamp means into said operative position in clamping engagement with a fixed part of said reactor so that said cylinder of said jack is axially fixed;

supplying fluid under pressure to said jack so as to exert a downward thrust on said piston and said operating tube and so as to exert a downward thrust on said capsule to force said capsule into position in said housing; and moving said operating rod so as to move said fingers and said clamp means to said inoperative positions thereof.

* * * * *